(12) United States Patent
Becht et al.

(10) Patent No.: US 8,123,394 B2
(45) Date of Patent: Feb. 28, 2012

(54) MIXER FOR LIQUID COLORANTS AND METHOD FOR MIXING LIQUID COLORANTS

(75) Inventors: Simon Becht, Florstadt (DE); Andreas Kluge, Obertshausen (DE); Maurice Weelen, AV Eys (NL); Martin Welp, Wettlingen (NL)

(73) Assignee: Evonik Degussa GmbH, Essen (DE)

( * ) Notice: Subject to any disclaimer, the term of this patent is extended or adjusted under 35 U.S.C. 154(b) by 1134 days.

(21) Appl. No.: 11/545,574

(22) Filed: Oct. 11, 2006

(65) Prior Publication Data

US 2007/0140045 A1    Jun. 21, 2007

Related U.S. Application Data

(60) Provisional application No. 60/730,861, filed on Oct. 28, 2005.

(30) Foreign Application Priority Data

Oct. 17, 2005    (DE) .......................... 10 2005 049 926

(51) Int. Cl.
*B01F 7/24* (2006.01)
*B01F 15/02* (2006.01)

(52) U.S. Cl. .................... 366/76.4; 366/138; 366/160.4; 366/172.2; 366/181.7; 366/321; 366/322

(58) Field of Classification Search .................... 366/88, 366/321, 327.4, 117–119, 174.1, 289, 332, 366/64–66, 192, 168.1, 171.1, 172.1, 172.2, 160.2–160.5, 162.1, 181.7, 266, 322, 138, 76.1, 76.3, 76.4, 76.6
See application file for complete search history.

(56) References Cited

U.S. PATENT DOCUMENTS 567,509 A  *  9/1896  Reitz ............................... 34/182
(Continued)

FOREIGN PATENT DOCUMENTS

DE      19728733 A1      1/1999
(Continued)

OTHER PUBLICATIONS

International Search Report for PCT/EP2006/066194 dated Sep. 8, 2006.
(Continued)

*Primary Examiner* — Charles E Cooley
(74) *Attorney, Agent, or Firm* — Law Office of: Michael A. Sanzo, LLC

(57) ABSTRACT

A mixer having a mixing pipe (1), a rotatable mixing unit (3) having back-mixing action, and a supply of the liquid colorant (4, 5) through the wall of the mixing pipe in the area of the mixing unit allows uniform mixing of liquid colorants of differing viscosities even with fixed-cycle supply of the liquid colorants. Mixing liquid colorants using this mixer allows direct dosing of the mixed liquid colorant into a plastic processing machine in the event of volumetric dosing of the employed liquid colorants.

22 Claims, 4 Drawing Sheets

U.S. PATENT DOCUMENTS

| | | | | |
|---|---|---|---|---|
| 696,282 | A * | 3/1902 | Upton | 366/321 |
| 1,427,271 | A * | 8/1922 | Eger | 366/88 |
| 1,523,184 | A * | 1/1925 | Eger | 366/80 |
| 2,733,051 | A * | 1/1956 | Street | 366/84 |
| 3,023,455 | A * | 3/1962 | Geier et al. | 425/208 |
| 3,382,536 | A * | 5/1968 | Fritsch et al. | 366/82 |
| 3,664,638 | A | 5/1972 | Grout et al. | |
| 3,702,691 | A * | 11/1972 | Fritsch | 366/86 |
| 3,810,716 | A * | 5/1974 | Abrahams et al. | 417/313 |
| 4,167,236 | A * | 9/1979 | Taubenmann | 222/135 |
| 4,252,667 | A * | 2/1981 | Stegmaier et al. | 588/5 |
| 4,265,858 | A * | 5/1981 | Crum et al. | 422/129 |
| 4,363,671 | A * | 12/1982 | Rugg et al. | 127/1 |
| 4,392,967 | A * | 7/1983 | Alexander | 508/454 |
| 4,457,258 | A | 7/1984 | Cocks | |
| 4,478,519 | A * | 10/1984 | Guibert | 366/75 |
| 4,486,102 | A | 12/1984 | Thiele et al. | |
| 4,534,652 | A * | 8/1985 | Stade | 366/85 |
| 4,653,990 | A * | 3/1987 | Schlecht | 417/517 |
| 4,715,216 | A * | 12/1987 | Muller | 73/61.55 |
| 4,744,669 | A * | 5/1988 | Kowalczyk et al. | 366/77 |
| 4,797,834 | A * | 1/1989 | Honganen et al. | 700/285 |
| 4,846,054 | A * | 7/1989 | Mange et al. | 99/495 |
| 4,884,594 | A * | 12/1989 | Powers et al. | 137/625.48 |
| 4,983,045 | A * | 1/1991 | Taniguchi | 366/117 |
| 5,103,730 | A * | 4/1992 | Sarda | 101/425 |
| 5,146,944 | A * | 9/1992 | Waldrum | 137/99 |
| 5,265,955 | A * | 11/1993 | Guggiari | 366/85 |
| 5,352,035 | A * | 10/1994 | Macaulay et al. | 366/15 |
| 5,391,000 | A * | 2/1995 | Taniguchi | 366/332 |
| 5,393,434 | A * | 2/1995 | Hutchins et al. | 210/656 |
| 5,399,256 | A * | 3/1995 | Bohs et al. | 204/409 |
| 5,403,168 | A * | 4/1995 | Evenson | 417/536 |
| 5,630,943 | A * | 5/1997 | Grill | 210/659 |
| 5,651,944 | A * | 7/1997 | Schulz et al. | 422/137 |
| 5,718,570 | A * | 2/1998 | Beckett et al. | 417/517 |
| 5,851,065 | A * | 12/1998 | Ikeda et al. | 366/76.6 |
| 5,961,213 | A | 10/1999 | Tsuyuki | |
| 6,344,172 | B1 * | 2/2002 | Afeyan et al. | 422/70 |
| 6,360,961 | B1 | 3/2002 | Marazzi | |
| 6,565,348 | B1 * | 5/2003 | Snijder et al. | 425/209 |
| 6,613,128 | B1 * | 9/2003 | Simonaru et al. | 95/260 |
| 7,090,391 | B2 * | 8/2006 | Taniguchi | 366/118 |
| 7,293,909 | B2 * | 11/2007 | Taniguchi | 366/118 |
| 7,350,961 | B2 * | 4/2008 | Taniguchi | 366/118 |
| 7,828,474 | B2 * | 11/2010 | Ishizuka et al. | 366/160.4 |
| 2003/0004229 | A1 | 1/2003 | Schermacher et al. | |
| 2003/0161215 | A1 * | 8/2003 | Hinken et al. | 366/300 |
| 2003/0198125 | A1 | 10/2003 | Linsen | |
| 2004/0057332 | A1 * | 3/2004 | Taniguchi | 366/118 |
| 2004/0089973 | A1 | 5/2004 | Hoang | |
| 2004/0108273 | A1 * | 6/2004 | Richardson et al. | 210/656 |
| 2004/0132103 | A1 | 7/2004 | Haubs et al. | |
| 2004/0174411 | A1 | 9/2004 | Sumiya et al. | |
| 2004/0198870 | A1 | 10/2004 | Sulzbach et al. | |
| 2005/0094486 | A1 * | 5/2005 | Taniguchi | 366/171.1 |
| 2006/0034147 | A1 * | 2/2006 | Murakami et al. | 366/75 |
| 2006/0120212 | A1 * | 6/2006 | Taniguchi et al. | 366/118 |
| 2006/0231473 | A1 * | 10/2006 | Taniguchi | 210/219 |
| 2007/0140045 | A1 * | 6/2007 | Becht et al. | 366/160.4 |
| 2010/0071362 | A1 * | 3/2010 | Alaze et al. | 60/581 |

FOREIGN PATENT DOCUMENTS

| | | | |
|---|---|---|---|
| EP | 1508364 A1 * | 2/2005 | |
| JP | 02043933 A * | 2/1990 | |
| JP | 10006363 A | 1/1998 | |
| JP | 11057441 A * | 3/1999 | |
| JP | 2000051675 A * | 2/2000 | |
| JP | 2001-106704 | * | 4/2001 |
| JP | 2007-105590 | * | 4/2007 |
| SU | 925637 A1 | 5/1982 | |
| WO | WO-02/087849 | 11/2002 | |
| WO | WO 2006024962 A2 | 3/2006 | |

OTHER PUBLICATIONS

Written Opinion for PCT/EP2006/066194.
Abstract for reference B2 (DE 19728733 A1).
Abstract I for reference B3 (JP 10006363 A).
Abstract II for reference B3 (JP 10006363 A).
Abstract for reference B4 (SU 925637 A1).
Nettelnbreker, et al., "Farbe Beim Aufbereiten Von Kunststoffen Automatisiert Messen Und Korrigieren," *Kunststoffe* 80:777-781 (1990).
English language translation of the International Search Report for PCT/EP2006/066194 filed Sep. 8, 2006.
English language translation of the Written Opinion of the International Searching Authority for PCT/EP2006/066194 filed Sep. 8, 2006.
English language translation of the International Preliminary Report on Patentability for PCT/EP2006/066194 filed Sep. 8, 2006.

* cited by examiner

MIXER FOR LIQUID COLORANTS AND METHOD FOR MIXING LIQUID COLORANTS

CROSS REFERENCE TO RELATED APPLICATIONS

The present application claims priority to German application no. 10 2005 049 926.0, filed on Oct. 17, 2005. The present application also claims the benefit of U.S. provisional application 60/730,861, filed on Oct. 28, 2005. The contents of these prior applications are hereby incorporated by reference in their entirety.

FIELD OF THE INVENTION

The present invention relates to a mixer for liquid colorants and a method for mixing liquid colorants performed using this mixer, which is suitable for on-demand dosing of liquid colorants in plastic processing machines.

BACKGROUND OF THE INVENTION

In the processing of plastics via plastic melts, the plastic is typically colored by masterbatches. Masterbatches are plastic granulates having a high content of coloring agent, which are added to the plastic during the processing via the melt in order to color the plastic. The use of masterbatches has the disadvantage that a separate masterbatch must be manufactured for every type of plastic and every color and must be stored ready for the plastic processing. Rapid changes to new colors or changes of the color tone are not possible, since a new masterbatch must be produced in each case.

Instead of masterbatches, liquid colorants may also be used for coloring plastics, the liquid colorant either being supplied with the noncolored plastic granulate to the machine which processes the plastic or being mixed with the already melted plastic in the machine. In this method, a liquid colorant mixed for the desired color tone is used, so that a corresponding liquid colorant must be produced and stored for every desired color. Rapid changes to new colors or a change of the color tone are also not possible here, since a new liquid colorant must be manufactured in each case.

Supplying multiple liquid colorants separately to a plastic processing machine and manufacturing plastics having different color tones via recipe-controlled dosing of the quantities of the individual liquid colorants has been suggested in WO 02/087849. This method has the disadvantage, however, that in the event of recipes having greatly differing mixing ratios of the individual liquid colorants, the mixing of the liquid colorants with the plastic is not sufficiently homogeneous on many plastic processing machines, so that unevenly colored products are obtained.

Therefore, there is a need for a mixer and a mixing method, by which homogeneously mixed liquid colorants for coloring plastics may be manufactured from individual liquid colorants according to a recipe, even with greatly differing proportions of the individual liquid colorants, the manufacture of the mixture being performed directly before the processing of the plastic in accordance with the demand of the plastic processing machine. The mixer must be capable of reliably mixing even thixotropic liquid colorants, which only flow at a specific shear load.

WO 99/34905 discloses a mixer for manufacturing paints, in which individual liquid colorants and one or more lacquer base materials are dosed into a shared chamber of the mixer and mixed in a downstream turbine mixer, before the mixture leaves the mixer. However, this mixer is less suitable for mixing liquid colorants of differing viscosity and density without adding larger quantities of a lacquer base material, as is necessary for coloring plastics, since the mixing of the liquid colorants then remains incomplete.

U.S. Pat. No. 3,664,638 discloses static mixers for mixing liquids, in which multiple helical mixing elements, each having an alternating rotational direction, are positioned in a pipe one after another. Static mixers of this construction are known to those skilled in the art under the names helical mixers or Kenics mixers and are typically used for mixing reactive components during the manufacture of two-component plastics or two-component adhesives.

Dynamic mixers, in which the mixing elements known from the helical mixers rotate in a mixing pipe, are also used for manufacturing two-component plastics. In these mixers, the two components are axially supplied to the mixing pipe at one end as in the static mixers.

The known static helical mixers and the mixers having rotating helical mixing elements using axial supply of the components are not suitable for mixing liquid colorants having different flow behaviors, however, as are used for coloring plastics, in the event of greatly differing mixing conditions. In the event of different viscosities of the liquid colorants to be mixed, there is uneven mixing of the more viscous components, however, so that mixtures having varying color tone are obtained. Similar problems also arise if the liquid colorants have different densities or one or more of the liquid colorants has thixotropic flow behavior.

JP-A 3-60727 discloses a static mixer in the construction of helical mixers, in which nozzles are positioned in the wall of the mixing pipe in order to mix a fluid with a fluid flowing through the pipe. The mixer is reported to have a high mixing action if small quantities of a fluid are mixed, via the nozzles in the wall of the mixing pipe, into a large fluid stream which flows through the mixing pipe.

EP-A 0 090 257 discloses a mixer for multiple component plastics, which has a mixing chamber having a piston rotating in the mixing chamber, a shear gap forming between the piston and the mixing chamber. The individual components are dosed radially into the shear gap and leave the mixer via an outlet opening opposite the piston. The mixer causes laminar flow in the shear gap and has no devices which move the content of the shear gap in the direction opposite to the outlet opening.

DESCRIPTION OF THE INVENTION

The object of uniform mixing of liquid colorants, even in the event of greatly differing proportions of the individual liquid colorants and different flow behaviors of the liquid colorants, may be achieved by the mixer according to the present invention and the method for mixing liquid colorants performed using the mixer.

The subject matter of the present invention is a mixer for liquid colorants, comprising a mixing pipe having an outlet opening at the end of the mixing pipe, a mixing unit, positioned in the mixing pipe so it is rotatable around the longitudinal axis of the mixing pipe, having at least two mixing elements, a portion of the mixing elements moving the contents of the mixer in the direction of the outlet opening and a portion of the mixing elements moving the contents of the mixer in the opposite direction in the event of identical rotational direction of the mixing unit, and at least two inlet openings for liquid colorants, which are positioned in the wall of the mixing pipe lying between the ends of the mixing pipe in the area of the mixing unit.

Furthermore, the subject matter of the present invention is a method for mixing liquid colorants, in which at least two liquid colorants are mixed in the mixer according to the present invention, the liquid colorants being fed to the mixer via the inlet openings for liquid colorants, while the mixing unit is moved around the longitudinal axis of the mixing pipe and the mixed liquid colorant leaves the mixer via the outlet opening at the end of the mixing pipe.

In addition, the subject matter of the present invention is a method for coloring plastics, in which at least two liquid colorants are mixed using the method according to the present invention for mixing liquid colorants with volumetric dosing and the mixed liquid colorant is supplied directly to a plastic processing machine.

Liquid colorants as defined in the present invention are compositions capable of flowing which contain one or more pigments in dispersed form and/or one or more dyes in dissolved form. The liquid colorants may be liquid or pasty and may even comprise thixotropic compositions, which only flow when a shear force which is higher than their yield point acts on them. The liquid colorants preferably contain up to 10 wt-%, particularly up to 20 wt-% pigments.

The mixer according to the present invention has a mixing pipe, at whose end an outlet opening for the mixed liquid colorant is located. The mixing pipe is preferably implemented so it may be closed during the mixing procedure at the end opposite the outlet opening, so that the liquid colorant mixed in the mixing pipe may only leave the mixing pipe through the outlet opening. A pressure retention valve may possibly also be positioned on the outlet opening in order to ensure that no mixed liquid colorant exits from the outlet opening as long as no liquid colorants are supplied to the mixer. The mixing pipe preferably has a circular cross-section and may have a cylindrical or conical shape, a cylindrical shape being especially preferred.

A mixing unit is positioned in the mixing pipe so that it is rotatable around the longitudinal axis of the mixing pipe. The mixing unit thereby has at least two mixing elements, a portion of the mixing elements moving the contents of the mixer in the direction of the outlet opening and a portion of the mixing elements moving the contents of the mixer in the opposite direction in the event of identical rotational direction of the mixing unit. Through this differing effect of the mixing elements on the contents of the mixer, back-mixing of the contents is caused via vortex formation in the mixer. The mixing elements are preferably dimensioned so that during one rotation of the mixing unit, the mixing elements are moved through at least 80% of the cross-sectional area, especially preferably at least 90% of the cross-sectional area of the mixing pipe. Through such dimensioning, mixing is caused over the entire cross-section of the mixing pipe. The mixing unit is preferably implemented so that it is replaceable, particularly so that it may be pulled out of the mixing pipe still assembled.

The mixing elements of the mixing unit preferably have the form of helical coils having alternating opposite rotational directions, as are known to those skilled in the art from the mixing elements of the helical mixers. However, other forms of mixing elements may also be used, such as stirrers having stirring blades with opposing pitch. The mixing unit preferably has at least 5, especially preferably at least 9 mixing elements, each having a different action on the contents of the mixer.

The actuation of the mixing unit, which sets the mixing unit in motion, may be produced arbitrarily. Preferably, the mixing unit is driven via a motor. The mixing unit is especially preferably driven via a shaft lying in the longitudinal axis of the mixing pipe from the end of the mixing pipe opposite the outlet opening. The mixing unit may be set into an oscillating or rotating movement by the drive, a rotating movement being preferred. If multiple mixing elements extend up to near the wall of the mixing pipe, in the event of a drive via a shaft lying in the longitudinal axis of the mixing pipe, no additional mounting of the mixing element in the mixing pipe is necessary.

The mixer according to the present invention additionally has at least two inlet openings for liquid colorants, which are positioned in the wall of the mixing pipe lying between the ends of the mixing pipe in the area of the mixing unit. The liquid colorants are accordingly supplied to the mixing pipe radially through the wall of the mixing pipe and not axially at the end of the mixing pipe. The inlet openings for liquid colorants are thereby preferably positioned so that at least 60% and especially preferably more than 80% of the length of the mixing unit lies between the inlet openings and the outlet opening at the end of the mixing pipe. The inlet openings for liquid colorants preferably lie in one to three planes and especially preferably in only one plane transverse to the longitudinal axis of the mixing pipe. The inlet openings may additionally be provided with shutoff valves or non-return valves, in order to prevent mixed liquid colorant from flowing back from the mixer into the lines leading to the inlet openings.

The inlet openings for liquid colorants and the mixing unit are preferably positioned so that during the movement of the mixing unit, at least one mixing element of the mixing unit is moved past each of the inlet openings at a small distance, preferably less than 1 mm distance, particularly preferably less than 0.5 mm distance. A high shear force is thus attained at the inlet openings for liquid colorant and improved mixing is achieved.

The mixer according to the present invention may additionally have one or more additional inlet openings for flushing liquid and/or compressed air, preferably both for flushing liquid and for compressed air, in order to be able to empty and clean the mixer in the event of a color change. In addition, the mixer may also have one or more outlet openings which allow emptying independently from the outlet opening at the end of the mixing pipe. The inlet openings for flushing liquid and/or compressed air and possibly additional outlet openings are preferably positioned radially near one end of the mixing pipe or axially at one end of the mixing pipe.

The method according to the present invention for mixing liquid colorants is performed in the mixer according to the present invention. Thereby, the liquid colorants are supplied to the mixer via the inlet openings for liquid colorants, while the mixing unit is moved around the longitudinal axis of the mixing pipe and the mixed liquid colorant leaves the mixer via the outlet opening at the end of the mixing pipe. Preferably, all openings besides the inlet openings for liquid colorants and the outlet opening at the end of the mixing pipe remain closed during the mixing procedure, so that the liquid colorants supplied via the inlet openings may only leave the mixing pipe via the outlet opening at the end of the mixing pipe after the mixing. In particular, the end of the mixing pipe opposite the outlet opening remains closed during the mixing.

The movement of the mixing unit during the supply of the liquid colorants may be oscillating or rotating, a rotating movement being preferred. A rotating movement at essentially constant speed is especially preferred. The velocity of the movement of the mixing unit may be selected by those skilled in the art within wide limits in accordance with the properties of the liquid colorants to be mixed. The velocity of the movement is selected so that it is at least sufficiently high for uniform mixing to be achieved. The velocity of the movement has an upward limit only by the occurrence of cavitation at the mixing elements. As long as gas, such as air, is still contained in the mixer, the velocity of the movement is preferably selected low, in order to avoid mixing in gas bubbles and to obtain a bubble-free mixture.

The method according to the present invention for mixing liquid colorants is preferably performed continuously or intermittently. If it is performed continuously, the liquid colorants are supplied in predefined volume ratios, so that a continuous flow of the mixed liquid colorant leaves the mixer. If the method is performed intermittently, the liquid colorants are supplied in predefined volume ratios in a first time interval, while alternately, in a following second time interval, the liquid colorants are not supplied. In intermittent operation, mixed liquid colorant only leaves the mixer during the first time interval, but not during the second time interval.

The liquid colorants are preferably supplied to the inlet openings for liquid colorants by volumetric dosing. In this case, the liquid colorants are supplied using predefined volume flows in predefined volume ratios, which result from the recipe for the desired color. The volumetric dosing is preferably performed through forced-delivery pumps, in which the delivered volume results compulsory from the mechanical movement of the pump. Suitable forced-delivery pumps are, for example, piston pumps, rotary piston pumps, and gear pumps. Double-piston pumps are preferably used for dosing the liquid colorants, in which liquid colorant is dosed alternately by one of two pistons, while the other piston is filled, so that a constant volume flow is dosed. Through volumetric dosing using forced-delivery pumps, a uniform composition of the mixed liquid colorant may be achieved reproducibly, without variations in the control of the dosing resulting in color variations. In addition, through the volumetric dosing, the quantity flow of mixed liquid colorant which leaves the mixer may be set precisely, so that using the method according to the present invention, the liquid colorant may be dosed directly into a plastic processing machine. In this case, the dosing may be performed continuously into a continuously operating plastic processing machine, for example, into an extruder. Similarly, dosing may be performed intermittently into a discontinuously operating plastic processing machine, such as an injection molding machine.

The volumetric dosing of the liquid colorant into the mixer according to the present invention is preferably controlled by the plastic processing machine, so that dosing may be performed directly into the plastic processing machine without an intermediate container. The control of the dosing of the liquid colorants into the mixer according to the present invention by the plastic processing machine is especially advantageously used for dosing into discontinuously operating plastic processing machines, such as injection molding machines.

The direct dosing from the method according to the present invention into a plastic processing machine allows rapid color change or an alteration of the color tone during the plastic processing, without a colorant mixture having to be prepared beforehand for this purpose or a colorant container having to be changed on the plastic processing machine.

Forced-delivery pumps which are driven by stepping motors are especially preferably used for dosing the liquid colorants. These pumps have the advantage of a significantly broader range of precisely and uniformly adjustable dosing rates compared to continuously driven pumps having variable-speed drive. While with variable-speed drive, the range from minimum to maximum dosing rates is typically not more than 1:100, by using a drive having stepping motors, ranges of more than 1:1000 may be implemented. Therefore, a larger range of mixing ratios may be set without replacing pumps and therefore a larger number of color tones may be produced. Motorized piston burettes which are driven by stepping motors are especially suitable for dosing the liquid colorants.

In the method according to the present invention the supply of the liquid colorants to the inlet openings for liquid colorants may be performed continuously or in fixed cycles in each case. Through the back-mixing occurring in the mixing pipe, even with fixed-cycle supply of one or more liquid colorants, uniform mixing without variations of the composition over time may be achieved using the mixer according to the present invention if the ratio between the average hold-up time of the mixed liquid colorants and the duration of a fixed cycle in the mixer is more than 5:1, preferably more than 10:1. The duration of a fixed cycle according to the present invention is the sum of the duration of an individual step of the colorant supply into the mixer and the duration of a pause between two such steps of the colorant supply. Through the possibility of fixed-cycle supply, even mixtures having greatly differing ratios of the liquid colorants used may be manufactured reproducibly without color variations using the method according to the present invention.

In the method according to the present invention, the mixing procedure is preferably interrupted for a color change and the mixer is cleaned using a flushing liquid in order to obtain a mixed liquid colorant having altered and uniform composition as rapidly as possible and keep the quantities of waste arising from a color change low. For this purpose, the supply of the liquid colorants is first interrupted and the mixing pipe is emptied by supplying compressed air. Subsequently, the mixing pipe is filled at least once with flushing liquid and the mixing unit is moved in order to remove the liquid colorant adhering to the mixing pipe and to the mixing unit with the flushing liquid. The mixing pipe is then emptied once again by supplying compressed air and subsequently the supply of the liquid colorants is continued in another ratio. If, in the method according to the present invention, the liquid colorant is dosed directly into a plastic processing machine, the contents of the mixing pipe emptied using compressed air and a first part of the liquid colorant mixed using an altered ratio are expediently conveyed to a separate collection container during the cleaning procedure, before the direct dosing into the plastic processing machine is continued. In principle, any liquid which is capable of dissolving or dispersing the components of the liquid colorants is suitable as the flushing liquid.

The flushing procedure is preferably performed so that at the end of the flushing procedure, all lines connected to the mixing pipe are filled with liquid. By avoiding gas cushions in supply lines, a more uniform flow of the mixed liquid colorant out of the mixer may be obtained during the following mixing procedure.

If an inlet opening is not needed for manufacturing the currently needed mixture of liquid colorants, the supply line for liquid colorant leading to this inlet opening is preferably at least partially filled with mixed liquid colorant from the mixing pipe after beginning the supply of the liquid colorants. This is preferably performed by briefly operating a pump used for supplying the liquid colorant in the reverse delivery direction. By at least partially filling the supply line with already mixed liquid colorant, contamination of the currently mixed liquid colorant by an undesired liquid colorant from a currently unneeded inlet opening may be avoided. In an alternative embodiment, the supply lines to unneeded inlet openings may also be at least partially filled with flushing liquid during the flushing procedure.

In the method according to the present invention for mixing liquid colorants, in addition to the at least two liquid colorants, still further free-flowing components or compositions may also be supplied via the inlet openings positioned in the wall of the mixing pipe. During the manufacturing of liquid colorants for coloring plastics, for example, UV stabilizers, antioxidants, flame retardants, plasticizers, or additives which improve the impact strength may also be admixed in order to add them to the plastic with the mixed liquid colorant.

Figure 3:
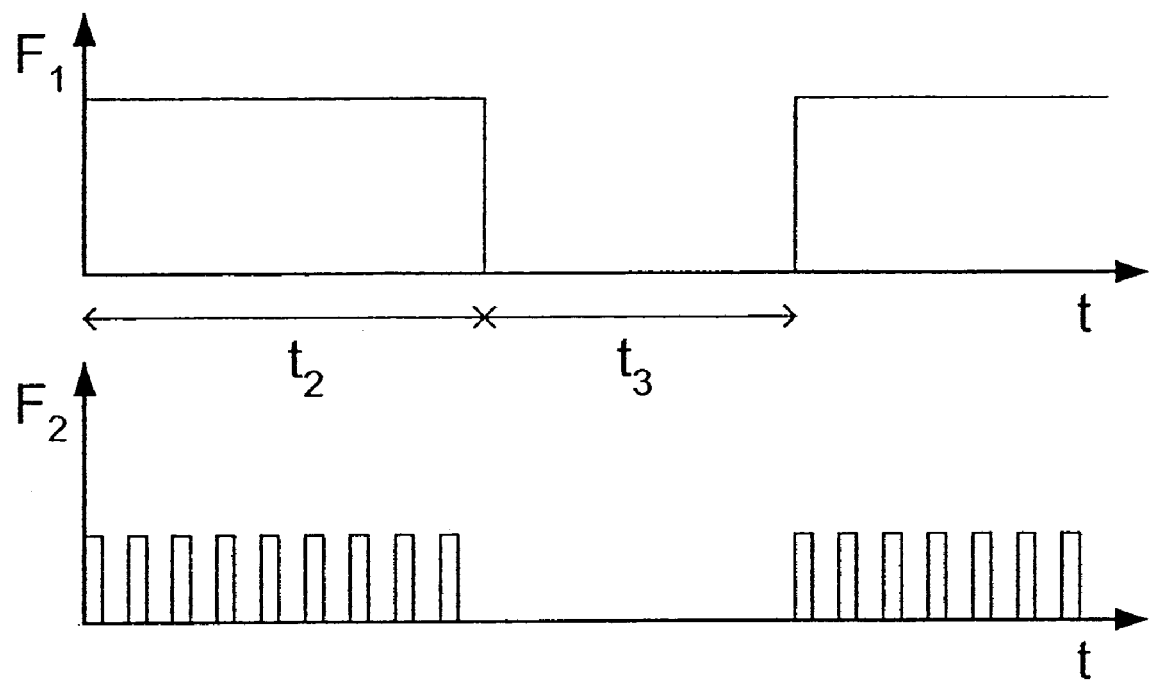

FIG. 3 shows the flow of liquid colorants plotted against time t for intermittent operation of the mixer with continuous dosing of the first liquid colorant at a flow rate $F_1$ and fixed-cycle dosing of the second liquid colorant at a flow rate $F_2$. During the intermittent operation, both liquid colorants are each dosed for a first time interval $t_2$ and the dosing of both liquid colorants is interrupted for a second time interval $t_3$.

Figure 4:
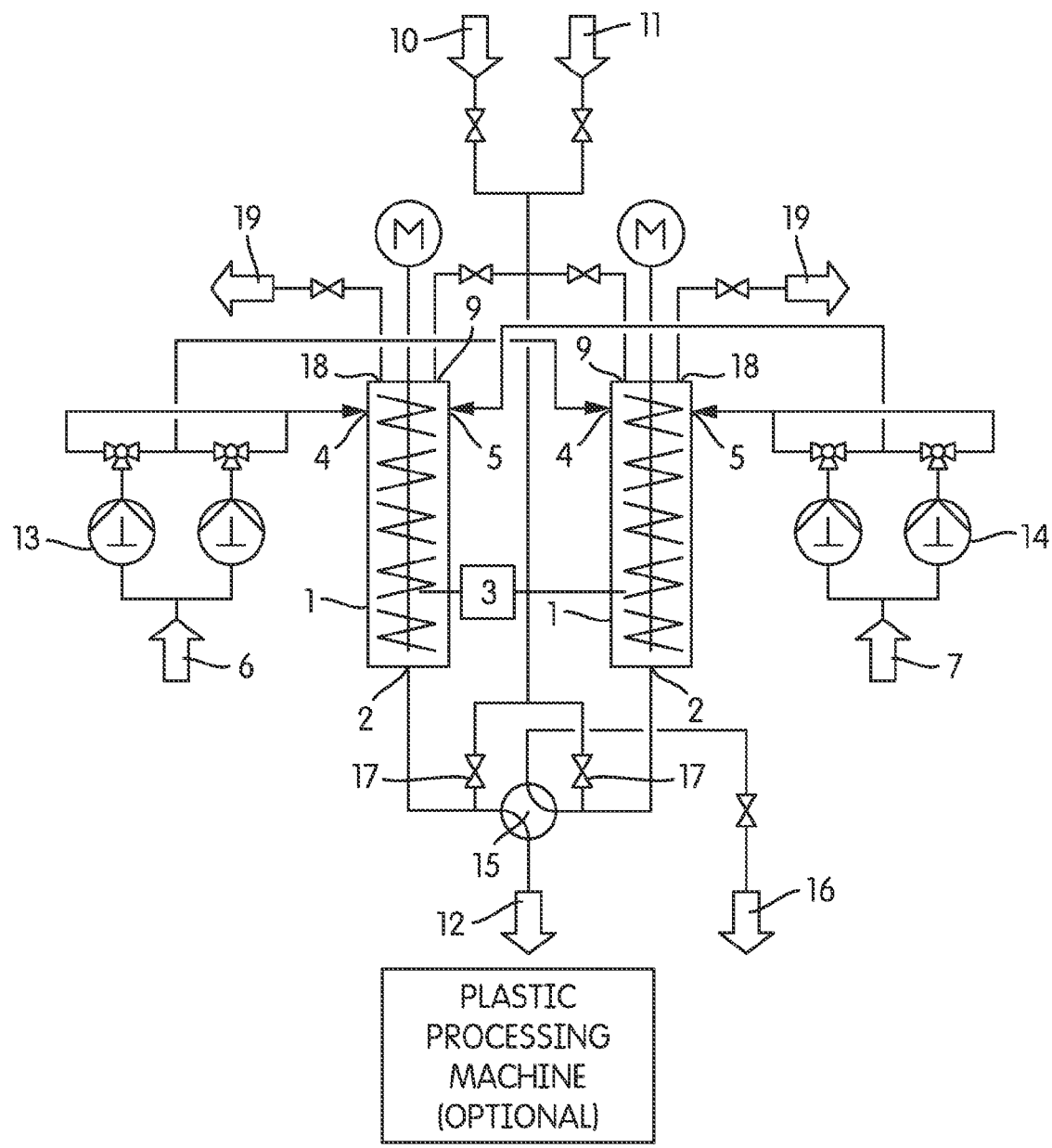

FIG. 4 shows a preferred embodiment of the mixer according to the present invention having two mixing pipes.

Figure 1:
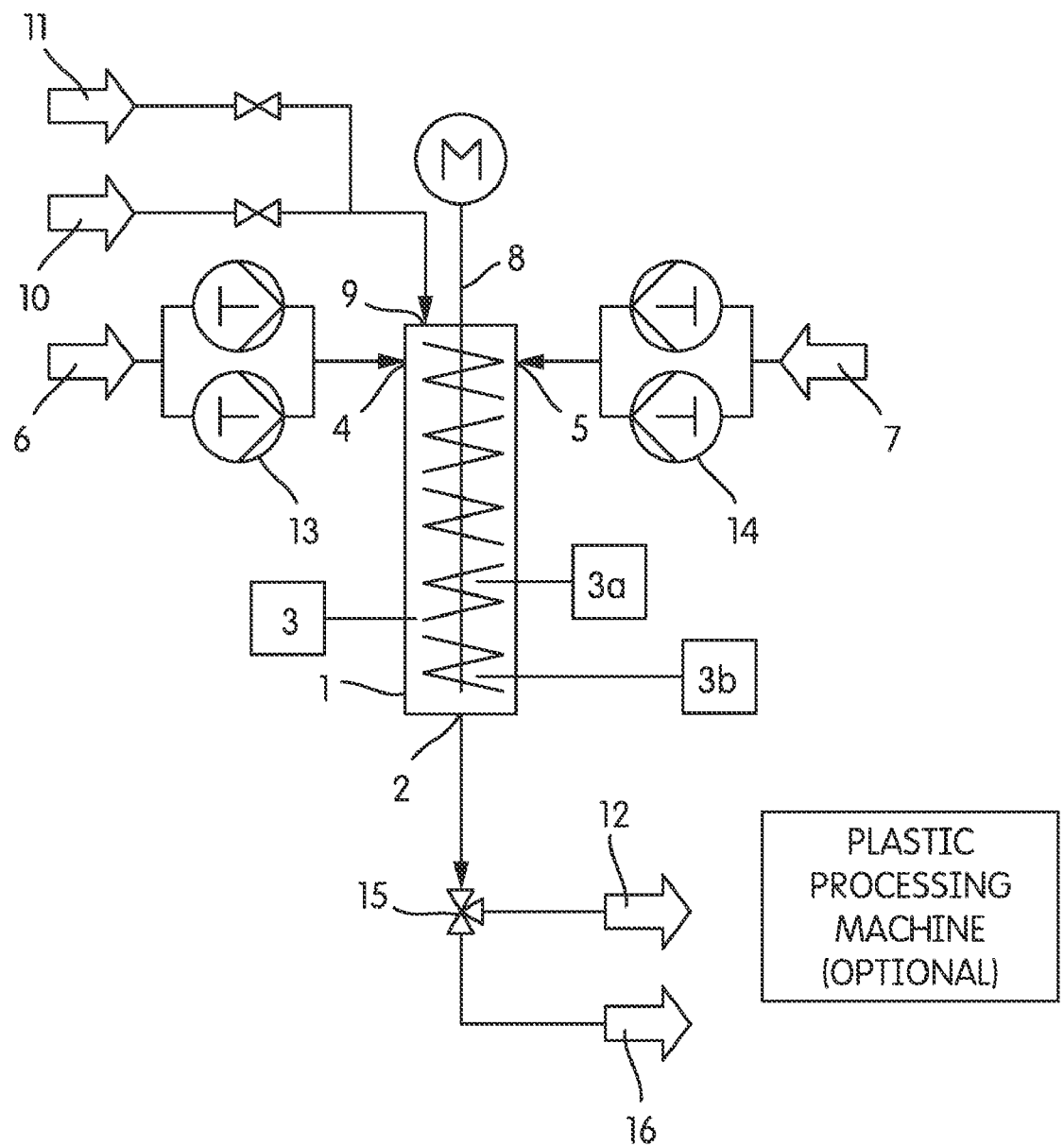
FIG. 1 shows a preferred embodiment of the mixer according to the present invention having mixing elements in the form of helical coils, additional inlet openings for flushing liquid and compressed air, and dosing of the liquid colorant by volumetrically dosing double-piston pumps.
Figure 2:
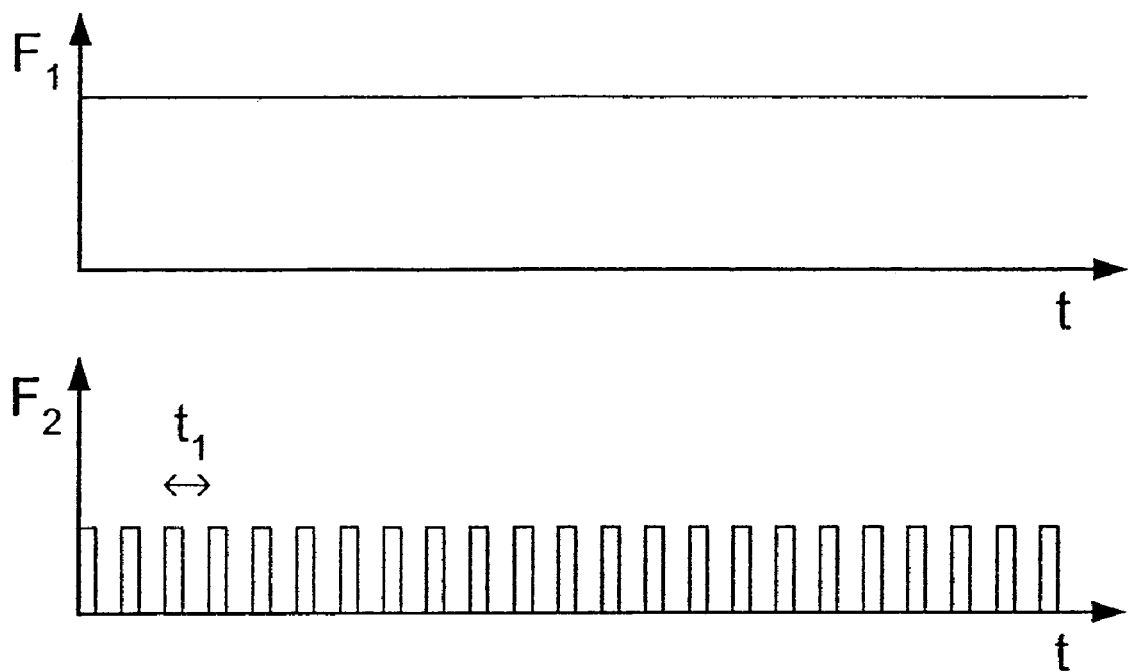
FIG. 2 shows the flow of liquid colorants plotted against time t for continuous operation of the mixer with continuous dosing of the first liquid colorant at a flow rate $F_1$ and fixed-cycle dosing of the second liquid colorant at a flow rate $F_2$ and a duration of a fixed cycle of $t_1$.

In the embodiment of FIG. 1, the mixer comprises a cylindrical mixing pipe (1) having an outlet opening (2) at the lower end of the mixing pipe (1). In the mixing pipe (1), a mixing unit (3), which is driven by a motor via a shaft (8), is positioned so it is rotatable around the longitudinal axis of the mixing pipe (1). The mixing unit (3) has a total of 5 mixing elements (3a, 3b) in the form of helical coils having alternating opposite rotational directions, which are moved through more than 80% of the cross-sectional area of the mixing pipe (1) during a rotation of the mixing unit (3). With identical rotational direction of the mixing unit (3), a first portion of the mixing elements (3a) moves the contents of the mixer in the direction of the outlet opening and a second portion of the mixing elements (3b) moves the contents of the mixer in the opposite direction. The mixer additionally has two inlet openings (4, 5) for liquid colorants (6, 7), which are positioned in the wall lying between the ends of the mixing pipe (1) in the area of the mixing unit (3) in a plane transverse to the longitudinal axis of the mixing pipe (1), so that more than 60% of the length of the mixing unit (3) lies between the inlet openings (4, 5) and the outlet opening (2) at the end of the mixing pipe (1). The inlet openings (4, 5) for liquid colorants (6, 7) and the mixing unit (3) are positioned in this case so that during the movement of the mixing unit, a mixing element (3b) is moved past the inlet openings (4, 5) at less than 0.5 mm distance. The mixer also has an additional inlet opening (9) for flushing liquid (10) and compressed air (11).

In an especially preferred embodiment of the method according to the present invention, two liquid colorants (6, 7) are supplied by double-piston pumps (13, 14) to the mixing pipe (1) via the inlet openings (4, 5) for liquid colorants (6, 7), while the mixing unit (3) rotates around the longitudinal axis of the mixing pipe (1). The end of the mixing pipe (1) opposite the outlet opening (2) and the additional inlet opening (9) remain closed in this case, so that all of the quantity of liquid colorants (6, 7) supplied to the mixer via the inlet openings (4, 5) leaves the mixer as mixed liquid colorant (12) via the outlet opening (2) and a valve (15). The double-piston pumps (13, 14) are driven via stepping motors in this case, so that the liquid colorants (6, 7) may be supplied to the mixer in fixed cycles, the ratio between the duration of a cycle and the average hold-up time of the mixed-liquid colorant in the mixer being selected as less than 1:10. The mixed liquid colorant (12) is supplied directly to a plastic processing machine, the volumetric dosing of the liquid colorants (6, 7) being activated by the plastic processing machine.

For a color change, the mixer shown in FIG. 1 is especially preferably cleaned by first stopping the dosing of the liquid colorants (6, 7) and closing the valve (15) via which the mixed liquid colorant (12) is supplied to a plastic processing machine. Subsequently, compressed air (11) is supplied via the additional inlet opening (9) and the contents of the mixing pipe (1) are emptied as a waste stream (16) into a collection container via the valve (15). The mixing pipe (1) is then filled completely with a flushing liquid (10) via the additional inlet opening (9) with valve (15) closed, the mixing unit (3) rotating and the mixing pipe (1) being ventilated via a ventilation opening (not shown) at the upper end of the mixing pipe (1). After approximately 30 seconds, during which the mixing unit (3) rotates further, compressed air (11) is supplied via the additional inlet opening (9) and the contents of the mixing pipe (1) are emptied as a waste stream (16) into a collection container via the valve (15). This flushing procedure is subsequently repeated again twice. The speed of the mixing unit (3) is then reduced and the liquid colorants (6, 7) are dosed at the new ratio, the valve (15) initially remaining open so that the mixed liquid colorant is supplied to a collection container as a waste stream (16). After a quantity of liquid colorants (6, 7) corresponding to the volume of the mixing pipe (1) has been dosed and the air has thus been displaced out of the mixing pipe (1), the speed of the mixing unit (3) is again increased to the original value. After a quantity of liquid colorants (6, 7) which corresponds to two to three times the volume of the mixing pipe (1) has been dosed, the valve (15) is switched so that the mixed liquid colorant (12) is again supplied to the plastic processing machine.

In the embodiment of FIG. 4, the mixer comprises two mixing pipes (1), each comprising an outlet opening (2), a mixing unit (3) and inlet openings (4, 5). Liquid colorants (6, 7) are supplied to the inlet openings (4, 5) by double-piston pumps (13, 14), whereby in each of the double-piston pumps the pistons may be actuated independently of each other and liquid colorant can be dosed from any of the two pistons independently of each other into any of the two mixing pipes via appropriately arranged valves. The two mixing pipes are connected by a valve (15) designed as a four-way valve in such a manner, that alternatively one of the mixing pipes is connected via a line with the device into which the mixed liquid colorant (12) is dosed, while at the same time the other mixing pipe is connected with a collection container for the waste stream (16). In addition to inlet openings (9) for flushing liquid (10) the mixer preferably also comprises valves (17), whereby flushing liquid (10) or compressed air (11) can also be passed via the outlet opening (2) into the mixing pipe (3), as well as additional outlet openings (18) for waste streams (19) at the end of the mixing pipe (3) opposite to the outlet opening (2). The additional valves (17) and outlet openings (18) allow flushing the mixing pipe in both directions and a thereby more effective cleaning of the mixing pipe for a color change.

The preferred embodiment of a mixer according to FIG. 4 allows to prepare a liquid colorant with a new, altered mixing ratio in a second mixing pipe for a color change, while still dosing from a first mixing pipe at the old mixing ratio. This shortens the down time for a color change, since only the line for mixed liquid colorant (12) leading from valve (15) to the consuming device has to be flushed or exchanged for the color change, while the cleaning of the mixing pipe can occur without interruption of the dosing of liquid colorant. The second mixing pipe is flushed and emptied with flushing liquid (10) and compressed air (11) as described above, while liquid colorants (6, 7) are still dosed into the first mixing pipe at the old mixing ratio and a mixed liquid colorant is obtained at the old mixing ratio via valve (15). Besides the supply of flushing liquid and compressed air via inlet opening (9) and emptying via valve (15), there is preferably additional flushing in the opposite direction by the supply of flushing liquid and compressed air via valve (17) and emptying via outlet opening (18). Subsequently, the second mixing pipe is filled with liquid colorants (6, 7) in the new mixing ratio as described above, while the dosing of liquid colorants into the first mixing pipe is continued at the old mixing ratio. For that purpose, the two pistons of a double-piston pump (13, 14) are operated in such a manner, as to dose from one of the pump pistons into the first mixing pipe at the old mixing ratio, while dosing from the other pump piston into the second mixing pipe according to the new mixing ratio. If one of the pump pistons dosing into the first mixing pipes has to be filled during this procedure, the filling of the second mixing pipe is interrupted, the ongoing dosing is switched to the second, still filled pump piston, the first pump piston is filled and thereafter filling of the second mixing pipe is continued, so that the ongoing dosing into the first mixing pipe is not interrupted. Preferably, with each of the double-piston pumps the pump piston not actually needed for dosing into the first mixing pipe is filled before the second mixing pipe is filled, then all pumps are switched to dosing into the first mixing pipe from the filled piston, thereafter the second pump piston not currently needed for dosing into the first mixing pipe is filled likewise and then filling of the second mixing pipe is started. With this procedure, the filling of the second mixing pipe can normally be completed before a switch between the pistons of a double-piston pump becomes necessary.

EXAMPLES

The experiments were performed in a mixer corresponding to FIG. 1 with a mixing pipe (1) having 8.3 mm internal diameter and 10 cm length. The mixing pipe had two inlet openings (4, 5), each 1.5 mm in diameter, at 8 cm distance to the outlet opening (2). A helical mixer MR 08-12 having 8 mm diameter and 93 mm length from Mixpac, which has 12 mixing elements in the form of helical coils with opposing directions, was used as the mixing unit (3). The mixing unit was set in rotation by a motor at 1500 rpm. Motorized burettes model PSD/8 from Hamilton were used as piston pumps (13, 14) for dosing the liquid colorants.

Example 1

A red and a white Polytrend 700 liquid colorant from Colortrend were supplied intermittently to the mixer radially via two different inlet openings (4, 5) in the volume ratio 10:9, resulting in a total volume flow of 1.8 ml/min. The time interval for supplying the liquid colorants and the time interval for interrupting the supply were each 10 seconds. To judge the mixing quality, individual droplets of mixed liquid colorant obtained at the outlet opening (2) were drawn out thinly on a microscope slide and visually evaluated. No inhomogeneities or variations of the color tone could be observed in the mixed liquid colorant.

Example 2

Comparative Example

Example 1 was repeated, but the two liquid colorants were not supplied radially via the inlet openings (4, 5), but axially via inlet openings in the end of the mixing pipe opposite to the outlet opening (2). The mixed liquid colorant had clearly recognizable variations in the color tone.

What is claimed is:

1. A mixer for liquid colorants, comprising:
    a) a mixing pipe having an outlet opening at an end of the mixing pipe;
    b) a mixing unit, positioned in the mixing pipe so it is rotatable around the longitudinal axis of the mixing pipe, and having at least two mixing elements, wherein said mixing elements are in the form of helical coils having alternating opposite rotational directions and, when in operation, a portion of said mixing elements move a content of the mixer in a direction towards the outlet opening and a portion of the mixing elements move a content of the mixer in an opposite direction with identical rotational direction of the mixing unit; and
    c) at least two inlet openings for liquid colorants, which are positioned in a wall of the mixing pipe between ends of the mixing pipe in an area of the mixing unit and wherein the inlet openings for liquid colorants in the mixing unit are positioned so that during a movement of the mixing unit, at least one mixing element of the mixing unit is moved past each of the inlet openings at less than 1 mm distance.

2. The mixer of claim 1, wherein the mixing pipe has a cylindrical shape.

3. The mixer of claim 1, wherein the mixing elements of the mixing unit move through at least 80% of a cross-sectional area of the mixing pipe during a rotation of the mixing unit.

4. The mixer of claim 1, wherein the inlet openings for liquid colorants are positioned so that at least 60% of the length of the mixing unit lies between the inlet openings and the outlet opening at the end of the mixing pipe.

5. The mixer of claim 1, wherein the inlet openings for liquid colorants lie in a plane transverse to a longitudinal axis of the mixing pipe.

6. The mixer of claim 1, wherein the mixing unit is driven from the end of the mixing pipe opposite the outlet opening via a shaft lying in a longitudinal axis of the mixing pipe.

7. The mixer of claim 1, comprising one or more additional inlet openings for flushing liquid and compressed air.

8. The mixer of claim 1, comprising two mixing pipes, whose outlet openings are connected via a valve with a common line for mixed liquid colorant.

9. The mixer of claim 8, comprising at least two double-piston pumps, each connected for dosing liquid colorant from both pistons of a double-piston pump independently of each other into any of the two mixing pipes.

10. A method for mixing liquid colorants, comprising mixing at least two liquid colorants in a mixer according to claim 1, wherein said liquid colorants are supplied to the mixer via the inlet openings while the mixing unit is moved around a longitudinal axis of the mixing pipe and mixed liquid colorant leaves the mixer via the outlet opening at the end of the mixing pipe.

11. The method of claim 10, wherein the mixing unit rotates around a longitudinal axis of the mixing pipe.

12. The method of claim 10, wherein the end of the mixing pipe opposite the outlet opening remains closed during the mixing.

13. The method of claim 10, wherein at least one of the liquid colorants is supplied to the mixer in fixed cycles, the ratio between an average hold-up time of the mixed liquid colorant in the mixer and a duration of a cycle being more than 5:1.

14. The method of claim 13, wherein at least one of the liquid colorants is supplied to the mixer using a pump which is driven by a stepping motor.

15. The method of claim 10, wherein the liquid colorants are dosed volumetrically to the mixer.

16. The method of claim 15, wherein the volumetric dosing of the liquid colorants is performed by forced delivery.

17. The method of claim 16, wherein the forced delivery is by double-piston pumps.

18. A method for coloring plastics, wherein at least two liquid colorants are mixed according to the method of claim 15 and the mixed liquid colorant is supplied directly to a plastic processing machine.

19. The method of claim 18, wherein the volumetric dosing of the liquid colorants is controlled by the plastic processing machine.

20. The method of claim 10, wherein no liquid colorant is supplied through at least one inlet opening and a supply line leading to this inlet opening is at least partially filled with mixed liquid colorant from the mixing pipe after beginning the supply of liquid colorants.

21. The method of claim 10, wherein color is changed by:
 a) interrupting the supply of the liquid colorants;
 b) emptying the mixing pipe by using compressed air;
 c) filling the mixing pipe with flushing liquid and moving the mixing unit;
 d) emptying the mixing pipe using compressed air; and
 e) supplying the liquid colorants is in another ratio.

22. The method of claim 10, wherein a mixer with two mixing pipes is used and at least two liquid colorants are supplied to one of the mixing pipes, while in the second mixing pipe, color is changed by:
 a) emptying the second mixing pipe using compressed air;
 b) filling the second mixing pipe is with flushing liquid and moving the mixing unit; and
 c) emptying the second mixing pipe using compressed air.

* * * * *